United States Patent [19]

Polster

[11] Patent Number: 4,506,995

[45] Date of Patent: Mar. 26, 1985

[54] SHORTENING MANAGEMENT METHOD AND APPARATUS

[76] Inventor: Louis S. Polster, 1017 Fairmount Rd., Burbank, Calif. 91501

[21] Appl. No.: 447,463

[22] Filed: Dec. 6, 1982

Related U.S. Application Data

[63] Continuation-in-part of Ser. No. 902,986, May 4, 1978, Pat. No. 4,362,094, which is a continuation of Ser. No. 732,214, Oct. 14, 1976, abandoned, which is a continuation of Ser. No. 627,089, Oct. 30, 1975, abandoned.

[51] Int. Cl.³ .................. G01N 3/60; G05B 15/02
[52] U.S. Cl. ........................ 374/57; 99/342; 364/557
[58] Field of Search ............ 374/45, 54, 57; 364/557, 477; 219/10.55 B

[56] References Cited

U.S. PATENT DOCUMENTS

| | | | |
|---|---|---|---|
| 2,987,704 | 6/1961 | Gimpel et al. | 364/557 |
| 3,028,747 | 4/1962 | Verderame et al. | 374/57 X |
| 3,673,852 | 7/1972 | Davis | 374/45 X |
| 3,745,810 | 7/1973 | McCarter | 374/54 |
| 4,197,581 | 4/1980 | Watrous et al. | 364/184 X |
| 4,229,798 | 10/1980 | Rosie et al. | 364/571 X |
| 4,309,584 | 1/1982 | Terakami | 219/10.55 B |
| 4,362,094 | 12/1982 | Polster | 99/342 |
| 4,413,175 | 11/1983 | Schilling et al. | 374/170 X |

*Primary Examiner*—Daniel M. Yasich
*Attorney, Agent, or Firm*—Allan M. Shapiro

[57] ABSTRACT

In deep fat frying, the shortening breaks down to be unuseable. The shortening management method and apparatus of this invention evaluates the effect of temperature, time and the kind and amount of product cooked in the deep fat fryer and utilizes look up table means in a computing circuit to signal when the shortening is becoming unuseable.

16 Claims, 2 Drawing Figures

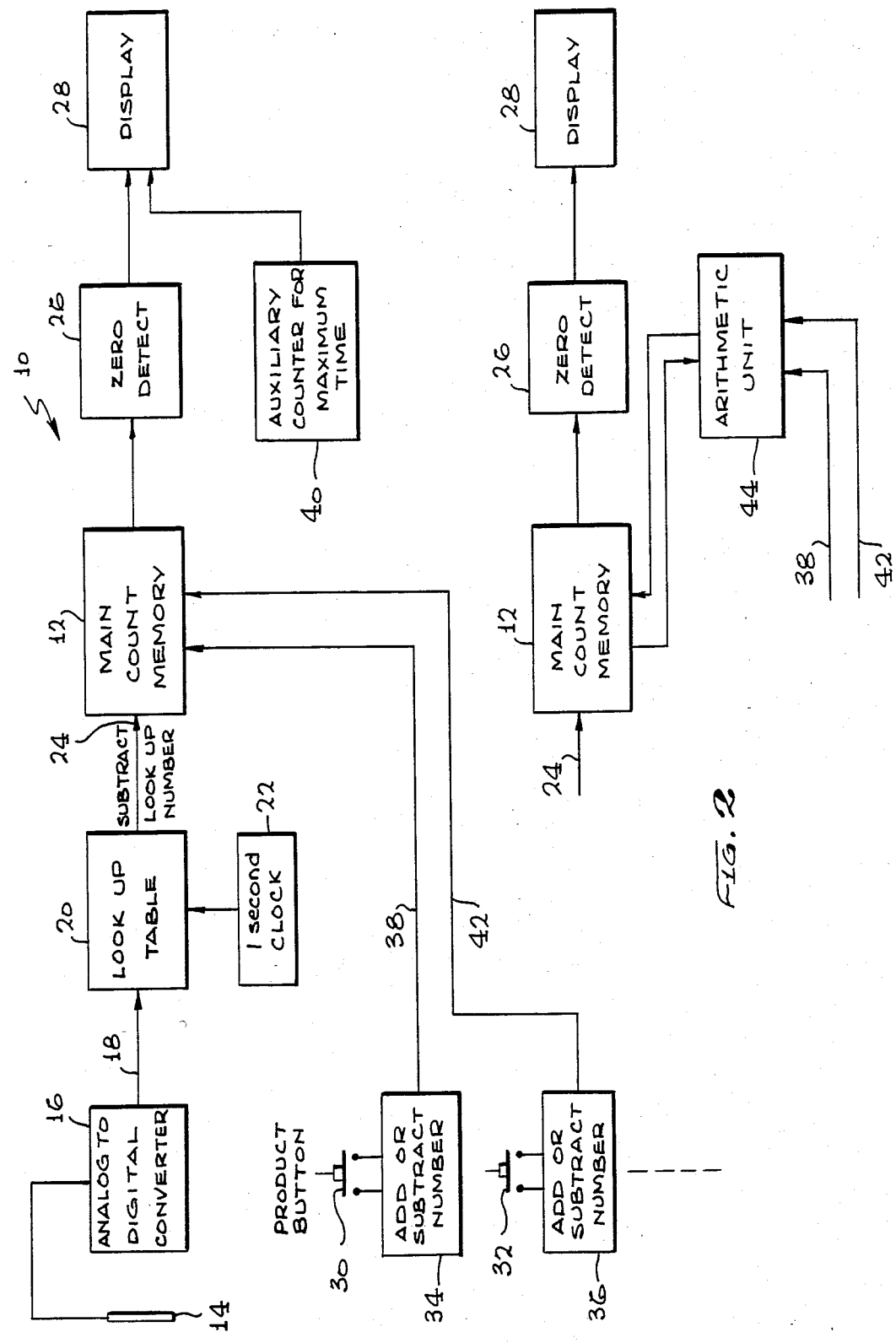

SHORTENING MANAGEMENT METHOD AND APPARATUS

CROSS REFERENCE

This application is a continuation-in-part of patent application Ser. No. 902,986 filed May 4, 1978, which issued as U.S. Pat. No. 4,362,094 on Dec. 7, 1982. That application was a continuation of patent application Ser. No. 732,214 filed Oct. 14, 1976, now abandoned. That application was a continuation of the original application Ser. No. 627,089 filed on Oct. 30, 1975 and which is now abandoned.

BACKGROUND OF THE INVENTION

This invention is directed to a shortening management method and apparatus wherein the criteria which cause breakdown of the shortening in a deep fat fryer are evaluated so that the apparatus can signal the operator that the shortening is reaching a state of non-useability.

The above-mentioned U.S. Pat. No. 4,362,094 discloses and claims a cooking time control system which, among other things, can signal the completion of cooking of a food item in a deep fat fryer. That patent describes in detail the manner in which the end of cooking time can be signaled to the cook, through correlating input information on time, temperature and the food material being cooked. This input data is also useful in evaluating the status and expected remaining life of the shortening employed in the cooking, as is described in detail in the following specification.

The types of shortenings used for deep fat frying have been studied, and there is published information on the manner of degradation. Fresh shortening contains triglycerides (a glycerine molecule with three fatty acids attached to it) and other similar complex molecules. When the shortening breaks down, the fatty acids break off. Other things occur, but the fatty acid level is considered to be the best general indicator of the usefulness of the shortening. New shortening has about a 0.03 percent concentration of free fatty acid. As the shortening is used in the deep fat fryer, degradation occurs, and by the time the free fatty acid concentration is about 3 percent, the shortening is substantially unuseable. The taste of the breakdown products builds up in the shortening and, at the 3 percent, the shortening is called rancid.

Some years ago, shortening was comparatively inexpensive and it was not an undue expense to simply throw away the shortening. However, shortening is more expensive in the present market. As a consequence, sometimes the shortening is not changed soon enough and the result is an inferior food product. In order to avoid this, some restaurants are changing their shortening more often than is necessary, with the resultant increase in operating costs.

What is needed is a shortening management method and apparatus by which the various factors affecting shortening life are evaluated, and a signal is emitted to indicate that the effective life of the shortening is substantially at an end.

SUMMARY OF THE INVENTION

In order to aid in the understanding of this invention, it can be stated in essentially summary form that it is directed to a shortening management method and apparatus wherein time, temperature and cooked product information, both as to type and quantity, is evaluated with respect to a deep fat fryer and a signal is emitted when conditions signal breakdown.

It is, thus, an object of this invention to provide a shortening management method and apparatus wherein the time and temperature effects and the effect of cooking products in the shortening of a deep fat fryer are evaluated so that the method and apparatus produce a signal related to the end of practical cooking life of the shortening.

It is a further object to provide a shortening management method and apparatus wherein the normal input information into a cooking time control system is employed to also provide indications of degradation of the shortening in a deep fat fryer with which the control system is associated.

It is a further object to provide a reliable shortening management method and apparatus wherein a reasonable life can be indicated for the shortening in a deep fat fryer, related to the time, temperature and utilization thereof, so that the shortening can be used as long as is practical so as to eliminate the replacement of shortening before the end of its practical lifetime.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a block diagram showing the relationship between the parts of the shortening management method and apparatus of this invention.

FIG. 2 is a partial diagram showing a modification of FIG. 1, and a second preferred embodiment of the method and apparatus of this invention.

DESCRIPTION OF THE PREFERRED EMBODIMENT

There are a number of factors which are related to the life of shortening when it is used for cooking in a deep fat fryer. A major factor is the time and temperature. Normal deep fat cooking temperatures range from 300 to 375 degrees F. and it is generally thought that the rate of shortening breakdown doubles with each about 25 degrees F. increase in cooking temperature. This relationship is thought to hold generally true within the usual cooking range, and will be used throughout this description as an operative example. The rate of shortening breakdown into free fatty acids is a power function which relates the deep fat temperature to time. The precise power function is not presently known. As an example of breakdown rates, shortening in the usual deep fat fryer breaks down in about three days to 3 percent free fatty acids at 350 degrees F.

In addition to temperature, there are other factors which affect the shortening breakdown rate. The factors which are related to the particular deep fat fryer include the surface area of the fryer. With more surface area, there is a higher oxidation rate because of the larger area in direct contact with air. In addition, the character of the heater is very important. The heater power versus the surface area of the heater is significant because it has to do with how hot the oil becomes in the boundary layer between the surface of the heater and the body of the oil. Another factor is the volume of the oil in the deep fat fryer. Factors which relate to the deep fat fryer, but which cannot be incorporated into the management system of this invention because of their random character, include the quality of the cleaning of the fryer after each draining of the deep fat. For the purpose of the shortening management method and apparatus of this invention, it must be assumed that the fryer is properly cleaned. Furthermore, the introduction of copper into the system, as by brazing with copper instead of stainless steel, causes very rapid breakdown of the shortening. However, such presence of copper is not in accordance with the deep fat fryer proper maintenance and cannot be accommodated for in the shortening management method and apparatus of this invention.

Another set of factors relating to the rate of shortening breakdown in a deep fat fryer, as the fryer is used for cooking food, all relate to the kind and quantity of food being cooked. French-fried potatoes are commonly cooked in a deep fat fryer. While the potatoes introduce water into the fryer during the cooking, this water boils off and has a small tendency to break down the shortening. However, the french-fries absorb about 10 percent of their final weight in shortening so that there is a significant amount of shortening removed with each basket of cooked french-fried potatoes. If french-fried potatoes are being cooked at a sufficient rate, the amount of oil added back to make up for the oil loss in the cooked potatoes being removed, in three days the equivalent amount of shortening will be added to the fryer that originally was in the fryer. Thus, when french-fried potatoes are being cooked, the apparent life of the shortening is longer than the life would be if there was no food at all being cooked in the deep fat fryer. However, while such lengthens the useful life of the shortening in the deep fat fryer, this is a dilution process in which some of the original oil remains. Therefore, it is necessary to change the shortening even though some considerations show that it need never be changed.

Other classes of products which may be cooked in the deep fat fryer include breaded products such as fish or chicken. Such food products lose some of their breading in the deep fat, and the lost breading tends to carbonize, which causes the oil to increase its breakdown rate towards free fatty acids. Furthermore, not as much breaded food product is placed in the basket so that there is less oil loss with consequent addition of fresh oil than for french-fried potatoes. Another common food product is a fruit turnover, which is a pastry item cooked in deep fat. This food product has a somewhat different net effect on shortening life. Furthermore, salt in a food product causes an increse in the shortening breakdown rate. Thus, it is clear that various factors affect the breakdown rate.

The cooking time control system disclosed in U.S. Pat. No. 4,362,094 issued Dec. 7, 1982 discloses a system which indicates the completion of cooking of a food item, providing a button is pressed when the food item is placed into the deep fat fryer. In that system, a different input is employed for each different type of food item so that the proper completion of cooking signal or "done" signal can be delivered for different types of food products being cooked. That patent also discloses sensing the temperature of the shortening to be able to properly signal the completion of cooking.

FIG. 1 illustrates in block diagram the apparatus 10 in accordance with the preferred embodiment of the shortening management method and apparatus of this invention. The inventive concept in this method and apparatus includes the choosing of a number which is related to the physical conditions of shortening in a deep fat fryer and acting on this number in accordance with temperature and cooking conditions so that the number reaches a predetermined value when it is desired to signal the end of reasonable life of the shortening in the deep fat fryer. Main count memory 12 is a resettable digital memory with at least subtraction capability associated therewith. In accordance with the preferred embodiment and in the particular example, main count memory also has addition capability associated therewith and is initially set for a large number like 4,320,000, for example, when the deep fat fryer is initially filled with new shortening. Analog temperature probe 14 is located in the shortening in the deep fat fryer to indicate its temperature. It is preferable to employ a probe directly in the deep fat, rather than employ the dial setting of the control thermostat as the temperature indication because of the above-discussed sensitivity of the shortening to degradation due to its temperature. Converter 16 converts the analog temperature signal from probe 14 into a digital signal in line 18. Line 18 is connected to look-up table 20 which is in the form of a digital memory. The relationship of the rate of shortening breakdown to temperature has been previously discussed, and a true power formula indicating the relationship has not been developed. Therefore, the empirical data relating breakdown rate to temperature is placed in the memory of look-up table 20. Look-up table 20 is thus proportioning means which provides an output signal proportioned to its two input signals. Clock 22 regularly emits a signal which causes table 20 to be active. In accordance with the present example, clock 22 is a 1 second clock that activates table 20 every second. In accordance with the particular example, when the temperature probe 14 indicates 350 degrees F. in the shortening, each 1 second cycle of clock 22 causes a subtractive number to appear in line 24 to subtract that number from the main count memory. In the present example, the number is 100. If the temperature probe 14 indicated a shortening temperature of 325 degrees F., then the number in line 24 would be 50. On the other hand, when the temperature probe 14 indicates the shortening is at 375 degrees F., the number in line 24 would be 200. Each second, the memory of look-up table 20 is searched and the resultant number is modified or subtracted from the total in main count memory 12. The output of main count memory 12 is connected to zero detector 26 which, in turn, is connected to display 28. When main count memory 12 reaches zero, zero detector 26 detects that fact and activates display 28 which indicates that the shortening in the deep fat fryer should be changed. Thus, the signal of end of reasonable life of the shortening purely as a function of time related to temperature is assured.

Pushbuttons 30 and 32 are available to be conveniently reached by the operator from his cooking position, and each is associated with a particular product. Thus, pushbutton 30 is pressed by the operator when a particular product such as potatoes for french-frying are placed in the shortening of the deep fat fryer. Additional product pushbuttons 32, only one being shown, are provided for each batch of product which can be cooked in the same deep fat fryer or vat, and the type of products may be the same or different for that fryer vat. Thus, pushbutton 32 is pressed when, for example, a different product such as breaded chicken is placed in the shortening of the deep fat fryer. These buttons may be the same buttons as the timer start pushbutton 16 in the previously mentioned U.S. Pat. No. 4,362,094. Pushbuttons 30 and 32 are respectively connected to signal units 34 and 36 so that, when the pushbutton is pressed, the signal unit is actuated to emit a numerical signal in respective lines 38 and 42 to memory 12. The type or magnitude of the numerical signal depends on the kind of effect on the life of the shortening in the deep fat fryer which is caused by the type of product. The signal emitted by a signal unit is a small number which may be positive or negative, i.e., additive or subtractive with respect to the large number in memory 12. If pushbutton 30 is assigned to be pressed when the product is french-fried potatoes, the signal emitted by signal unit 34 in line 38 is a small number which is additive to the large number in the memory because, in accordance with the previous discussion, the cooking of french-fired potatoes in the shortening removes "old" shortening and requires the addition by the operator of "new" shortening, this having a net increase on the expected life of the shortening in the vat. In other conditions, the number may be subtractive. However, if the number in line 38 is additive and the product button 30 is pressed sufficiently often, then the main count memory 12 may never reach zero, and the shortening may have an apparent unlimited life. However, in those circumstances, it is desirable to indicate the end of useful life of the shortening independent of factors related to the temperature of the shortening and the product cooked therein. For this reason, timer 40 is connected to display 28 so that the display 28 is actuated when timer 40 times out. Timer 40 is set, e.g., to 200 hours when the shortening is replaced. In this way, display 28 indicates effective end of shortening life after 200 hours even though temperature or product factors would indicate a longer life.

Pushbutton 32 is actuated by the operator when a different kind of product is placed in the shortening of the deep fat fryer. Breaded chicken is an example of such a product. When pushbutton 32 is actuated, signal unit 36 emits a signal through line 42 which is a number to be subtracted from the main count memory 12. Since the product is breaded chicken, the number to be subtracted may be larger than the number for a different kind of product, such as french-fried zucchini, for the reasons discussed above. In this way, the main count memory 12 is acted upon in different ways for different products so that the display 28 is actuated as a function of the number and kinds of food product cooked in the shortening as well as time versus temperature of the shortening.

FIG. 2 illustrates arithmetic unit 44 between the signal units 34 and 36 and the main count memory 12. The arithmetic unit 44 receives signals from the actuation of the product buttons 30 and 32 via respective signal units 34 and 36 and their lines 38 and 42. The arithmetic unit of FIG. 2 is employed to provide the dilution factor previously discussed. The signal units 34 and 36 provide positive or negative effect numbers corresponding to the degradation caused to the shortening by the cooking of that product. These numbers are adjusted in arithmetic unit 44 for the loss of shortening and consequent dilution by new shortening of the main body of shortening in the fryer as a consequence of cooking that product, and provide the so-modified numbers to the memory 12. For maximized accuracy, arithmetic unit 44 also receives continually updated information as to the current magnitude of the large number in memory 12 so that the dilution factor applied by the arithmetic unit 44 to the product numbers is continually modified by the effect of the then-existing magnitude of the large number. Thus, by the use of the arithmetic unit 44, the dilution factor is accommodated separately from the shortening degradation factor which results directly from cooking.

In use, the shortening management apparatus of FIGS. 1 and 2 has a value inserted into the main count memory 12 when the shortening is replaced. The number inserted into memory 12 is related to the kind of shortening, the quantity of shortening in the particular deep fat fryer, the geometry of the deep fat fryer, and the power and area of the heater. This is the starting value and has been referred to as the "large number". On a time cycle basis, deducted from the beginning main count number or "large number" is a number which is related to the temperature of the shortening in the deep fat fryer and which is related to the rate of breakdown of the shortening as a function of temperature. Since this is not a linear function and a sufficiently accurate formulary relationship has not been established, the memory in look-up table 20 is inspected at each clock cycle to produce a negative or subtractive number corresponding to the shortening temperature. Furthermore, signals indicating the cooking of a particular food product cause operation on the number in the main count memory. In the case of breaded products such as onion rings and chicken, contamination of the shortening oil with proteins, salt or breading increases the rate of shortening degradation so that a small number is deducted from the main count memory. Upon the cooking of each different product, a different product button is actuated so that the number's change is related to the amount of degradation caused by cooking that particular product. In this way, display 28 is actuated when the shortening has reached a particular state of degradation in its life. As previously indicated, when the fatty acid content of the shortening reaches about 3 percent, then the shortening is at about the end of its useful life.

The main count memory 12 may be set so that the display is actuated before the shortening reaches the end of its useful life. In a cooking situation where there is a plurality of deep fat fryers, it may be desirable to place the new shortening in a deep fat fryer that is dedicated to cooking the most sensitive food. In that case, the main count memory 12 might be set so that display 28 is actuated when the free fatty acid content reaches 1 percent. Thereupon, the shortening is moved to a second deep fat fryer which is dedicated to cooking a less sensitive food. When moved to the second deep fat fryer, the main count memory 12 of the second deep fat fryer may be reset to a value wherein display 28 will be actuated when the free fatty acid content reaches 2 percent. Thereupon, the shortening may be moved to a third deep fat fryer which is dedicated to cooking a less sensitive, more highly spiced food product. Upon moving the shortening to the third deep fat fryer, the main count memory 12 of the third deep fat fryer may be reset to a number so that display 28 is indicated when the free fatty acid content of the shortening reaches 3 percent to signal the end of its useful life. In this particular illustration, it is seen that the main count memory 12 need not be set to a number which corresponds to the end of useful life of the shortening, but may signal intermediate states of the shortening. Accordingly, a proper lifetime of use is achieved from the shortening without either substantial overuse or underuse of the shortening to thereby conserve the cost of replacing the shortening too soon or overuse the shortening to result in poor quality food product.

The above description of the preferred embodiments refers to beginning and operation with a positive preselected number entered into the main count memory 12 and subtracted from that memory until zero is reached and, thereupon, signals that event. Such is a convenient way to handle digits in a modern digital memory. However, it is equally possible to start with a negative number in the main count memory 12 and add to it for the same result. Similarly, the cycle can start with zero in the main count memory 12 and digits can be added and/or subtracted therefrom until a predetermined total is reached, whereupon the signal is effected. In modern digital handling, such information processing is easily managed. Furthermore, an analog system could be used. In such a case, the main count memory 12 could be a capacitor which is charged to a preset limit by means of the time-temperature relationship established by temperature probe 14 and clock 22. Similarly, actuation of a product button 30 or 32 could affect the charge. However, an electrical analog system of that nature is more difficult to manage because of the potential electrical leakage over the several-day use of the memory.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A shortening management apparatus for signalling the state of degradation of shortening in a cooking apparatus comprising:
    a main memory in a computing circuit means, means for setting said main memory with an initial value;
    means for sensing the temperature in shortening being managed;
    a clock associated with said means for sensing shortening temperature;
    proportioning means connected to both said clock and said means for sensing shortening temperature for producing a signal which is related to the time rate of degradation of the shortening at the sensed temperature, said proportioning means being connected to said memory for modifying the value in the memory in accordance with the signal from said proportioning means;
    input means connected to said main memory for modifying the value in said main memory upon each actuation of said input means; and
    signal means connected to said main memory for producing a signal when the value in said main memory reaches a predetermined value.

2. The shortening management apparatus of claim 1 wherein said main memory is a digital memory and initial preset value therein is a digital number.

3. The shortening management apparatus of claim 2 wherein said input means is a manually operable pushbutton which is actuated when a food product is placed in the shortening for cooking therein and said connection from said input means to said main memory transmits a digital signal.

4. The shortening manangement apparatus of claim 1 wherein said input means is a manually operable pushbutton which is actuated when a food product is placed in the shortening for cooking therein and said connection from said input means to said main memory transmits a digital signal.

5. The shortening management apparatus of claim 4 wherein there is a plurality of said input means and each of said input means is for actuation when a different product is placed in the shortening for cooking therein, and each of said input means produces a different signal for modification of the value present in said main memory.

6. The shortening management apparatus of claim 5 wherein a second clock is connected to said signaling device for actuating said signaling device when said second clock times out, independently of the value in said main memory.

7. The shortening management apparatus of claim 1 wherein a second clock is connected to said signaling device for actuating said signaling device when said second clock times out, independently of the value in said main memory.

8. The shortening management apparatus of claim 7 wherein said main memory and said proportioning means are digital devices and said input means is a manual input means connected to a digital device so that the value modified in said main memory is a digital value and said proportioning means and said input means produce digital signals which modify the digital signal in said main memory.

9. A shortening management apparatus for signaling when the shortening in a deep fat fryer has substantially reached a predetermined state of degradation due to use, said apparatus comprising:
    a digital main memory in a computing circuit means for setting to an initial value when the shortening is replaced in the deep fat fryer;
    a temperature sensor for positioning to detect the temperature of the shortening, said temperature sensor having an output signal, means connected to said temperature sensor for producing a digital equivalent of the sensed temperature, a digital look-up table memory, said digital sensed temperature means being connected to said look-up table memory, a clock connected to said look-up table to repetitively actuate said look-up table to emit a signal related to the rate of degradation of the shortening at the sensed temperature, said look-up table memory being connected to said main count memory so that the signal from said look-up table memory is delivered to said main count memory to cyclically modify the value in said main count memory in accordance with the sensed temperature;
    input means for actuation when a food product is put in the shortening to be cooked therein, said input means being connected to said main count memory and emitting upon actuation a digital signal corresponding to the degradation caused to the shortening by that cooking operation so that the value stored in said main count memory is modified by each cooking operation in the deep fat fryer;
    a detector connected to said main count memory for signaling when the value in said main count memory reaches a predetermined value; and
    an output connected to said detector to signal when the value stored in said main count memory has reached the predetermined value to indicate a particular condition of degradation of the shortening in the deep fat fryer.

10. The shortening management apparatus of claim 9 wherein there is a plurality of input means, and each of said input means is a manual input means which is to be manually actuated upon placing a different food material into the shortening of the deep fat fryer to be cooked so that each input means signals a different shortening degradation factor to said main count memory in accordance with the kind of food product being cooked.

11. The shortening management apparatus of claim 10 wherein there is a second clock connected to said signaling device so that said signaling device is actuated upon time-out of said second clock independently of the value in said main count memory.

12. The shortening management apparatus of claim 9 wherein there is a second clock connected to said signaling device so that said signaling device is actuated upon time-out of said second clock independently of the value in said main count memory.

13. The method of managing shortening in a deep fat fryer comprising the steps of:

establishing in a main memory in a computing circuit means an initial predetermined value upon changing the shortening in the deep fat fryer;

periodically sensing the temperature of the shortening and adjusting the value stored in the main memory in accordance with the time-temperature degradation of the shortening in accordance with the cyclically sensed temperature;

signaling the placement of a product into the shortening in order to be cooked and modifying the value stored in a look up table of the main memory in accordance with the amount of degradation caused to the shortening by the introduction of the product therein;

detecting when the value stored in the main memory reaches a predetermined value; and signaling when the memory has reached the predetermined detected value.

14. The method of managing shortening in a deep fat fryer as defined in claim 13 wherein the passage of time from the introduction of shortening into the deep fat fryer is also sensed and said signaling device is actuated when the sensed predetermined time passage is reached.

15. The method of managing shortening in accordance with claim 14 further including the step of differently manually signaling to the main memory in accordance with introduction of different products into the shortening so that the different degradation of the shortening caused by different introduction of product causes different adjustment of the value stored in said main memory.

16. The method of managing shortening in accordance with claim 13 further including the step of differently manually signaling to the main memory in accordance with introduction of different products into the shortening so that the different degradation of the shortening caused by different introduction of product causes different adjustment of the value stored in said main memory.

* * * * *